(12) United States Patent
Norman et al.

(10) Patent No.: US 8,505,086 B2
(45) Date of Patent: Aug. 6, 2013

(54) MANAGING COMMUNICATIONS BETWEEN ROBOTS AND CONTROLLERS

(75) Inventors: David Anthony Norman, Greenville, TX (US); Robert H. Mimlitch, III, Rowlett, TX (US); Corey Lee Chitwood, Greenville, TX (US); Richard D. Torrance, Greenville, TX (US); Mark J. Lambert, Greenville, TX (US); Brandon Lee Martus, Nevada, TX (US); Lester E. Heath, III, Dallas, TX (US)

(73) Assignee: Innovation First, Inc., Greenville, TX (US)

( * ) Notice: Subject to any disclaimer, the term of this patent is extended or adjusted under 35 U.S.C. 154(b) by 889 days.

(21) Appl. No.: 12/106,944

(22) Filed: Apr. 21, 2008

(65) Prior Publication Data

US 2008/0263628 A1 Oct. 23, 2008

Related U.S. Application Data

(60) Provisional application No. 60/913,243, filed on Apr. 20, 2007.

(51) Int. Cl.
*H04L 29/06* (2006.01)
(52) U.S. Cl.
USPC .............. 726/11; 318/568.12; 318/568.15; 901/1; 901/22; 901/23; 901/43; 901/45; 901/50; 726/1; 726/6; 713/155; 700/245; 700/248
(58) Field of Classification Search
USPC ............... 713/155; 700/245, 248; 726/1, 6, 726/11; 901/1, 22, 23, 43, 45, 50; 318/568.11, 318/568.12, 568.15
See application file for complete search history.

(56) References Cited

U.S. PATENT DOCUMENTS

| | | | |
|---|---|---|---|
| 4,938,483 A | 7/1990 | Yavetz | |
| 6,247,994 B1 | 6/2001 | DeAngelis et al. | |
| 6,254,486 B1 | 7/2001 | Mathieu et al. | |
| 6,491,566 B2 | 12/2002 | Peters et al. | |
| 6,535,793 B2 | 3/2003 | Allard | |
| 6,674,259 B1 | 1/2004 | Norman et al. | |
| 7,127,325 B2 | 10/2006 | Nagata et al. | |
| 7,193,384 B1 * | 3/2007 | Norman et al. | 318/568.1 |
| 7,297,044 B2 | 11/2007 | Small et al. | |

(Continued)

OTHER PUBLICATIONS

Howitt et al., "Wireless industrial sensor networks: Framework for QoS assessment and QoS management", pp. 347-359, ISA Transactions, vol. 45, No. 3, Jul. 2006.*

(Continued)

*Primary Examiner* — Jeffrey Pwu
*Assistant Examiner* — Hee Song
(74) *Attorney, Agent, or Firm* — Fish & Richardson P.C.

(57) ABSTRACT

The present disclosure is directed to a system and method for managing communications with robots. In some implementations, a computer network, where operators interface with the network to control movement of robots on a wireless computer network includes a network arena controller and a plurality of robot controllers. The network arena controller is configured to provide firewall policies to substantially secure communication between robot controllers and the associated robots. Each controller is included in a different robot and configured to wirelessly communicate with the network arena controller. Each robot controller executes firewall policies to substantially secure wireless communication.

30 Claims, 7 Drawing Sheets

Classroom Control – Only One PC

U.S. PATENT DOCUMENTS

| | | | |
|---|---|---|---|
| 7,706,895 B2 | 4/2010 | Callaghan | |
| 7,758,399 B2 | 7/2010 | Weiss et al. | |
| 7,905,761 B2 | 3/2011 | Weiss et al. | |
| 7,979,889 B2 * | 7/2011 | Gladstone et al. | 726/1 |
| 2003/0216834 A1 | 11/2003 | Allard | |
| 2004/0268119 A1 * | 12/2004 | Smetters et al. | 713/155 |
| 2006/0005254 A1 * | 1/2006 | Ross | 726/27 |
| 2006/0209868 A1 | 9/2006 | Callaghan | |
| 2006/0293788 A1 * | 12/2006 | Pogodin | 700/245 |
| 2007/0199108 A1 * | 8/2007 | Angle et al. | 901/17 |
| 2008/0269949 A1 | 10/2008 | Norman et al. | |
| 2008/0281467 A1 * | 11/2008 | Pinter | 700/245 |
| 2010/0075744 A1 | 3/2010 | Baratti et al. | |

OTHER PUBLICATIONS

Richard S. Wolff, "Wireless Mobile Robots: A Tool for Undergraduate Electrical Engineering Instruction", Apr. 2006, http://web.reed.edu/nwacc/programs/grants/final_reports05/wireless_robot_finalv2.pdf.*

International Search Report and Written Opinion of the International Searching Authority issued in International Application No. PCT/US2008/061039 filed Apr. 21, 2008, mailed Apr. 17, 2009, 15 pages.

International Preliminary Report on Patentability issued in International Application No. PCT/US2008/061039 filed Apr. 21, 2008, mailed Nov. 4, 2009, 7 pages.

* cited by examiner

Field Competition Block Diagram

Block Diagram – Without Firewall / Bandwidth Limits

Classroom Control – Only One PC

Single Control with PC

Single Control no PC

Typical Driver / Control Setup

Typical Robot Setup

Robot Controller – Any User System

PC User Process

MANAGING COMMUNICATIONS BETWEEN ROBOTS AND CONTROLLERS

CLAIM OF PRIORITY

This application claims priority under 35 USC §119(e) to U.S. Patent Application Ser. No. 60/913,243, filed on Apr. 20, 2007, the entire contents of which are hereby incorporated by reference.

CROSS-REFERENCE TO RELATED APPLICATION

This application is related to co-pending application entitled "Securing Communications With Robots", filed on Apr. 21, 2008 and assigned U.S. Ser. No. 12/106,949.

TECHNICAL FIELD

This invention relates to network communications and, more particularly, to managing communications in robot competitions.

BACKGROUND

Robot competitions have become popular in the recent past. The robot competitions are used as incentive to motivate people of all ages to become interested in math, science, and engineering; robot design and development; and used as entertainment events. One popular robot competition is organized for high school students and uses small robots on 12 ft. square fields. In these robot competitions, contestants of the robot competitions are asked to create robots to perform a wide range of tasks, such as picking up tennis balls, stacking blocks of wood, and everything in-between. Other popular robot competitions have been organized and conducted by people with robots built as a hobby to perform more advanced activities. Furthermore, more robot competitions have been organized by for-profit promoters, and match contestants against one another to design large, dangerous robots that clash in an arena for a fight, such as a boxing or wrestling match.

Robot competitions are generally concerned with five issues: (i) event safety, (ii) event integrity, (iii) event flow, (iv) event control, and (v) robot competition technologies. These five issues are important from liability, learning, and revenue generated standpoints. Event safety is an extremely important issue for robot competitions. Depending upon the robot competition, the robots may range in size from ounces to hundreds of pounds, and may reach speeds of up to 30 miles per hour or more in relatively short distances. Additionally, the robots may include gripping devices, arms, and lifts to be utilized during the robot competitions that could injure spectators or robot operators.

While the size, strength, and capabilities of the robots may in and of themselves be dangerous, the event safety issue is exponentially increased due to tens or several hundreds of robots being entered in any robot competition. Contestants prepare and test the robots prior to entering the arena for an event, the contestants routinely lose control of their robots due to a robot malfunction, radio control interference, or human error.

With regard to radio interference, robot competitions have been conducted traditionally in two ways, (i) allowing contestants to utilize mixed, non-uniform radio equipment, and (ii) requiring contestants to utilize consistent point-to-point radio equipment. In the case of contestants utilizing mixed radio equipment, contestants generally have adapted model airplane radio controllers for the robots because these radio controllers have more capability and frequency channels than radio controllers for remote control cars, for example. However, because the model airplane radio controllers transmit at high power levels, generally two watts or more, these radio controllers are problematic for robot competitions due to, for example, radio frequency (RF) noise, electromagnetic interference (EMI), co-channel interference, and multipath effects due to being in an indoor environment. These radio control problems may cause unexpected effects, such as a contestant controlling a robot of a different contestant or a robot performing mysterious actions. Also, the use of mixed radio equipment often results in two or more contestants operating on or near the same frequency, which may likely cause a contestant to unknowingly drive a robot of another contestant, thereby creating a dangerous situation for the contestants, organizers, spectators, and robots. These model airplane and model car transmitters are, by law, not typically allowed to receive from the robot, and therefore do not permit feedback from the robot.

With regard to event integrity, an organizer of the robot competition is concerned with conducting a fair and honest competition. In the traditional robot competitions, contestants utilizing both the mixed and consistent radio equipment have no absolute regulation to prevent early starts, late starts, or late stops of the robots. For activity-type competitions, a contestant may cheat and start or continue the activity prior to or after a clock starts and stops. In a fight-type competition, a contestant may strike an opposing robot prior to or after the clock starts and stops. If such an early or late strike occurs, the opposing robot may suffer irreparable damage, and the contest may be jeopardized, thereby destroying the integrity of the event as the contest cannot be replayed. In more modern robot competitions, contestants utilize consistent point-to-point radio equipment with field controllers, arena controllers, robot controllers, and operator interfaces that have built in safeguards for safety and match start/stop control.

With regard to event flow, as radio controllers are essentially unregulated, including operating on the same frequencies and having high power transmitters, robot competition organizers are required to confiscate radio controllers from the contestants to minimize safety hazards. The organizers often utilize as many as fifteen people to confiscate and guard the radio controllers in a storage room. In the case of non-consistent radio equipment, organizers have instituted different techniques, including both low budget and elaborate techniques, to assign frequency channels to contestants. These techniques range from (i) attaching a number to a clothes pin to be used for checking out the radio controller for a match,
(ii) utilizing a software program that helps ensure that two contestants do not operate on the same or close frequency simultaneously, and
(iii) utilizing a spectrum analyzer to monitor frequency channel usage. Even using these techniques to avoid having two radios operating on the same frequency, mistakes have routinely been made and safety has been jeopardized. It is common to find a contestant's radio to be transmitting on a different frequency than expected. Some common causes are human error, intentional misuse, mislabeled crystals, poor or old equipment, and lack of knowledge of the equipment by the contestant. Also, contestants routinely have additional radio controllers that are "backups" that are not confiscated and pose a safety hazard.

In the case of using consistent radio equipment, such as having transmitters operating on frequency channels A, B, C, and D, confusion and accidents routinely occur as contestants have trouble with installation of the radio equipment, forget to return the radio equipment, or simply use their own radio equipment. Installing radio equipment into the robot electronics for the first time may produce unexpected results or no results at all. Contestants often wish to perform last minute testing of the robots prior to entering the robot competition. Without having a radio controller (because the organizers only have enough for competition purposes), such a test is not possible. Furthermore, as the robots may weigh several hundred pounds or more and be track driven, the contestants may need radio control to move the robot between different staging areas, and to load and unload the robot from the arena. Issues resulting from poor control of match starts and stops, as mentioned previously, leads to re-match requests by contestants for the reason of fairness. Re-matches cause havoc for schedules, adding complexity and confusion to event flow. Logistical problems associated with the event flow issue often cause delay before, during, and after a match, and alter smooth flow of the overall robot competition.

In the case modern robot competitions, contestants utilize consistent point-to-point radio equipment, often with field controllers, arena controllers, robot controllers, and/or operator interfaces to quickly connect robots to the correct operator interface, set proper radio channels, and eliminate other problems that result in re-matches. As these competitions grow in size, they become limited by the number of radio channels available. This limit is sometimes made worse by systems that use one radio channel per driver. Most modern competitions allow two drivers, similar to a pilot and co-pilot, to control the robot; thus sometimes using two radio channels per robot. Allowing feedback from the robot doubles the number of required radio channels again. Additionally, these competitions are becoming popular in other countries where radio frequency regulations vary widely. This often requires many different radios to be developed to allow competitions in these other countries. These issues with the number of channels directly effects event flow as the number of robots and contestants grows. Multiple fields become necessary to complete the event in a reasonable amount of time. As the required number of fields grows beyond the 2-4 fields commonly used today, event management generally becomes more difficult. Already, some events are forced to run alternating matches where a match on field "A" must finish before match "B" can start, and so on.

With regard to the event control issue, organizers of the robot competition are interested in controlling frequency usage and regulating start and stop times of the robots for safety, event integrity, and event flow considerations. However, traditional robot competitions have been unsuccessful in implementing a viable solution to handle the event control issue. While the coordinators have tried to regulate and assign frequency channels, problems still occur. Organizers rely on unregulated equipment and a contestant honor system. Data rejection via a checksum or robot identifier signal to be verified by the robots is an idea that simply has not been instituted. Also, contestants tend to start and stop a match early and late to gain a competitive advantage and frequency channels are routinely crossed due to a mix-up of issuing radio controllers by the organizers of the robot competitions.

With regard to robot competition technology, the rapidly changing nature of technology creates a desire to provide more sophisticated robot capabilities and more varieties of game play. Improved robot sophistication and variety of game play can help increase the learning potential to participants and increase the excitement for audiences. In the traditional and more modern robot competitions that use point-to-point radio technology, communication is limited to a driver-to-robot scenario, either one way or bidirectional. Modern computer networks allow robots to easily communicate and coordinate effort with other robots, often without human intervention. In addition, modern communication has brought a new instant messaging communication that allows text communications from human-to-human, and this could be extended to human-to-robot, robot-to-human, and robot-to-robot communications. Even greater technological advancements have been brought about by broadband communications that allow large amounts of data to be moved quickly, efficiently, and securely. This broadband communication has allowed for streaming audio and video, distribution of 2D and 3D maps, and large file transmission. Extending this broadband capability to robot competitions is currently limited by their radio technology.

With respect to variety of game play, robot competition games and the rules that govern the game are currently static. It is common for competitions to attempt to create new and exciting games, often changing the game every year. In traditional robot competitions, games tend to have one set of rules that are fixed throughout each match, and throughout the game season. Due to limitations in the communication of traditional robot competition, changing the game in the middle of the match cannot easily be accomplished due the inability to quickly and efficiently distribute the new rules instantly to any suitable number of contestants, robots, and perhaps even to the game field.

SUMMARY

This disclosure contemplates using or implementing any suitable technique for performing these and other tasks. It may be understood that these flows are for illustration purposes only and that the described or similar techniques may be performed at any appropriate time, including concurrently, individually, or in combination. In addition, many of the steps in these flowcharts may take place simultaneously and/or in different orders than as shown. Moreover, systems may use methods with additional steps, fewer steps, and/or different steps, so long as the methods remain appropriate. In short, although this disclosure has been described in terms of certain embodiments and generally associated methods, alterations and permutations of these embodiments and methods may be apparent to those skilled in the art. Accordingly, the above description of example embodiments does not define or constrain the disclosure. Other changes, substitutions, and alterations are also possible without departing from the spirit and scope of this disclosure, and such changes, substitutions, and alterations may be included within the scope of the claims included herewith.

The details of one or more embodiments of the invention are set forth in the accompanying drawings and the description below. Other features, objects, and advantages of the invention may be apparent from the description and drawings, and from the claims.

DESCRIPTION OF DRAWINGS

Like reference symbols in the various drawings indicate like elements.

DETAILED DESCRIPTION

Figure 1:
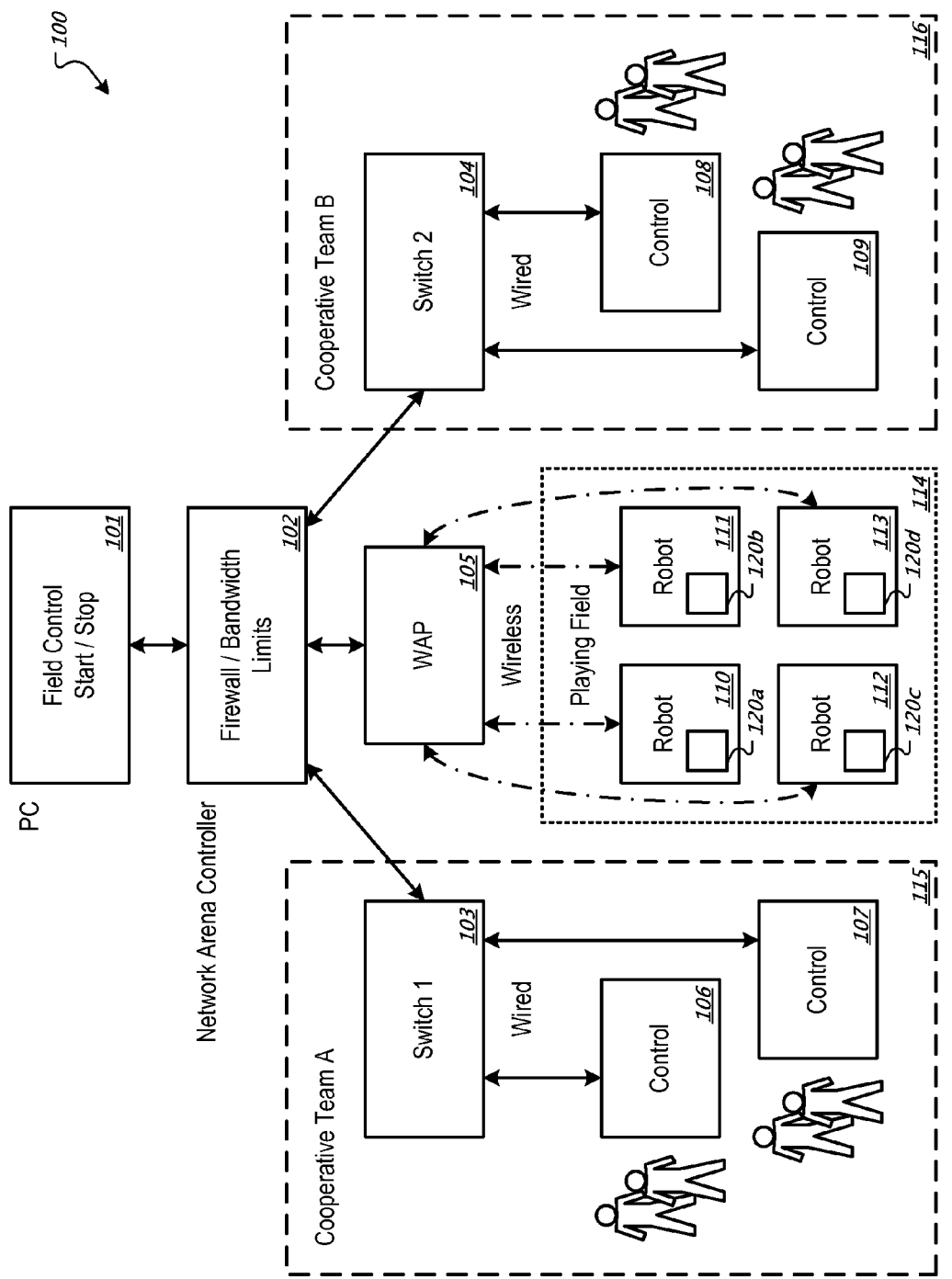
FIG. 1 is a block diagram illustrating an example robot competition control system.

FIG. 1 is a block diagram illustrating an example robot competition control system 100 configured to manage communications during robot competitions. For example, the system 100 may manage network bandwidth as well as security protocols (e.g., firewall policies) between operator stations and participating robots. Security protocols may include passwords, encryption keys, firewall policies, network addresses, as well as other security elements. In some implementations, the system 100 may automatically configure participating robots with firewall policies to provide substantially secure communication sessions between operator stations and the associated robots.

At a high level, the system 100 includes a field control device 101 for controlling aspects of each round of competition (e.g., scoring, time) and a Network Arena Controller (NAC) 102 for managing communications between operator stations 106-109 and associated robots 110-113. In some examples, the NAC 102 may manage the wireless access point (WAP) 105 such as limiting bandwidth used between the operator stations 106-109 and associated robots 110-113. In some examples, the NAC 102 may automatically configure the robots 110-113 with firewall policies using the WAP 105. In some implementations, the robots 110-113 and associated operator stations 106-109 may be assigned to different competition teams such as the illustrated Cooperative Team A 115 and the Cooperative Team B 116. As for a high level description of operation, the NAC 102 may periodically poll the playing field 114 or otherwise identify robots 110-113 are located in the playing field 114. In response to at least identifying the participating robots 110-113, the NAC 102 may automatically configure the robots 110-113 to communicate with the operator stations 106-109. In some implementations, the NAC 102 may automatically configure the robots 110-113 to communicate using one or more security protocols. In connection with establishing communication sessions, the field control device 101 may control the competition by, for example, enabling or disabling communication sessions using the NAC 102. In some implementations, the field control device 101 may execute other processes such as time keeping, scoring, and/or others. The interconnection method for data sharing, data security and the multiplexing of the wireless data onto a single or reduced number of radio frequency channels can be, for example, a computer Ethernet network.

Turning to a more detailed description of the elements, the operator/control stations 106-109 can include any software, hardware, and/or firmware configured to monitor and/or control associated robots 110-113. For example, the operator stations 106-109 may transmit command functions to the robots 110-113 in response to at least one input of a user. The operator stations 106-109 may receive inputs from a user using, for example, a joystick, buttons, knobs, and/or other forms of digital and/or analog inputs resulting in commands to move the robot. The operator stations 106-109 may execute command functions that directly drive robot motors and/or actuators that cause robot movement and/or manipulation. In some implementations, the command functions may be higher level instructions that are processed by the robot and converted into action by the robot processor. In addition, the operator stations 106-109 may present status information of associated robots 110-113. For example, status information may include robot battery voltage, motor temperatures, manipulator positions, robot direction, robot velocity, and/or other robot or game specific data that can be determined or otherwise identified by the robots sensors and processors. In some implementation, each operator station controls a specific robot such as the operator station 106 may control the robot 110. In the illustrated implementation, the operator stations 106-109 are coupled to the NAC 102 through the switches 103 and 104. The operator stations 106-109 typically represent an individual team that may be part of a Cooperative Team Group 115 or 116. The operator stations 106-109 may each have one or more human operators that direct the motion of their respective robot 110-113. The operator stations 106-109 may allow input from the operators to be sent through the network to other authorized destination. The operator stations 106-109 may also receive data and messages from a variety of authorized sources on the network. In some implementations, the operator stations 106-109 can be a laptop computer with Ethernet. See the description of FIGS. 5 and 8 for more details. The robots 110-113 typically each include a robot controller described in FIGS. 6, 7.

The switches 103 and 104 can include any software, hardware, and/or firmware configured to multiplex signals between the operator stations 106-109 and the NAC 102. For example, the switch 103 may multiplex signals between the operator stations 106 and 107 and the NAC 102. In some implementations, the switches 103 and 104 can selectively switch connections between the operator stations 106-109 and the common arbitration device called the NAC 102. The switches 103 and 104 may be hardwired Ethernet switches connecting the operator stations 106-109 to the NAC 102. In some implementations, the switch 103 or 104 may keep data separate between the two control stations or even each team 115 and 116. By utilizing managed switches, VLANs (Virtual Local Area Network) and other current security measures may be utilized to keep the traffic separated from the user stations 106 and 107. The switches 103 and/or 104 may be configurable such that additional rules may be created to keep data from each robot and operator (a team) on that side from seeing or being influenced by another team's data on the same side. In some implementations, each of the switches 103 and 104 are connected with one of the teams 115 or 116. In this case, these separate switches 103 and 104 are connected directly to the NAC 102. In a free-for-all type competition without team cooperation, the operator stations 106-109 may have a direct connection to the NAC 102. Separate switches 103 and 104 or separate connections to the NAC 102 build security between opposing operator stations 106-109. Another possible advantage to using one switch per side may be that the amount of cable length may be reduced from the operator stations 106-109 to the NAC (102) as compared to running full length cables from the operator stations 106-109 to the NAC 102. Internal network security involves several methods including multiple network switches, isolated WAP, multiple firewalls, and multiple quality of service (QoS) limits.

The NAC 102 can be any software, hardware, and/or firmware configured to manage the communications in the system 100. For example, the NAC 102 may be an electronic device performing router functions, for example a PC that executes router, firewall and quality of service functions. In some implementations, the NAC 102 may execute one or more of the following: automatically configure the robots 110-113 to communicate with associated operator stations 106-109; configure robots 110-113 with security protocols (e.g., security keys, firewall policies, network addresses); manage bandwidth used by the communication sessions between the robots 110-113 and the operator stations 106-109; as well as others. The NAC 102 may also monitor and log traffic before, during and after competition matches to verify connectivity, monitor battery levels, monitor radio signal strength, monitor robot states and status, verify bidirectional communication between the robots 110-114 and the control stations 106-109 as well as monitoring for network issues such as packet loss or interference. In regards to establishing communication sessions, the NAC 102 may automatically assign each robot 110-113 in the playing field 114 with a network address (e.g., Internet Protocol (IP) address) to route communications sessions between the operator stations 106-109 and the robots 110-113. The NAC 102 may also provide other information (e.g., technical, logical) to the operator stations 106-109 and/or the robots 110-113 used to transmit information. Such information may include bit rates, communication protocol, safety commands such as stop all robots, radio signal strength, packet or data loss, current state of the robot, and/or technical or non-technical communications from the field, including judges, referees or event staff that may include changes to game rules, notification of change to game state (start, stop autonomous, etc. . . . ), notification of penalties and other messages.

In some implementations, the NAC 102 may execute security processes that substantially prevent one or more security risk. Such security risk, intentional or otherwise, may include one or more of the following: attempts to disrupt network data flow causing denial-of-service or unacceptable network delay; attempts to overload an individual network device such as operator stations 106-109 or robots 110-113 with so much data that their individual connection to the system 100 is diminished, delayed, or otherwise interfered with; attempts to take control of an opposing team's robot; attempts to spoof someone on the system 100 by falsifying a network address for various reasons; and/or others. The likelihood that any authorized network users (operator stations 106-109, robots 110-113) may intentionally attempt malicious network may be unlikely for the following reasons: teams may be aware that all (or substantial) communications are monitored; teams may know that offending parties attempting malicious network traffic may be disqualified; and the limited access to the official arena network may limit their ability to attempt undetected hacking. The NAC 102 may execute one or more security processes during unintentional disruptions in the system 100 and/or any other system device. In some implementations, the NAC 102 can provide a substantially robust, reliable, and monitored network system such that can substantially ensure teams that the fault lies with the particular team 115 or 116. In the event that one of the robots 110-113 performs an unexpected way (due to robot failure, intermittent robot actions, or unintended software results), the NAC 102 may substantially prevent the teams 115 or 116 from requesting a new match based on problems with the network, the wireless system, an opposing team, etc. In other words, the NAC 102 may execute security processes such that the system 100 may substantially ensure that any problems that the teams 115 or 116 encounter are a result of the team's equipment. For example, the NAC 102 may use a software or hardware firewall to monitor and limit traffic to and from opposing operator stations 106-109.

In some implementations, the NAC 102 can substantially conceal and maintain in confidence the wireless networks Service Set IDentification (SSID). In this implementation, the robots 110-113 including the robot controllers 120, and/or the WAP 105 may not be configured to broadcast the SSID. In addition, the NAC 102 may modify, change, or otherwise update the SSID in response to an event such as a request, expiration of time, completion of a specific number of matches, and/or others. In some implementations, the NAC 102 encrypts prior to transmitting a communication session to the robots 110-113 and decrypts messages received from the robots 110-113. For example, the NAC 102 may execute encryption processes based on, for example, Wi-Fi Protected Access (WPA) or WPA2. The NAC 102 may execute encryption protocols depending on, for example, what the networking devices and software can handle. In some implementations, the NAC 102 can periodically modify, change or otherwise update the WPA password in response to an event such as a request, an expiration of time, completion of a certain number of matches, and/or others. The NAC 102 may transmit the network SSID and/or the WPA password to the robot controllers 120 prior to a match. For example, the NAC 102 may only transmit the security parameters immediately before each match and only through a direct wired connection to the NAC 102. In the case of a direct wired connection with the robot controllers 120, the NAC may setup certain (or a majority of) parameters for secure robot communication. In some implementations, no person or non-robot may know the network SSID or WPA password. In addition, the NAC 102 may execute a firewall such that the NAC firewall monitors and limits connections to and from the wireless robots 110-113 and the operator stations 106-109. For example, the NAC 102 may discard unauthorized transmissions to robots 110-113 using the firewall, which may reduce network congestion. In some implementations, the NAC 102 may not have the ability to limit connections from robot-to-robot.

In some implementations, the NAC 102 can predetermine and configure the network setup and limitations used in securing the network communications in the system 100. For example, when the robot controllers 120 are tethered to the NAC 102 before a match, the NAC 102 may transmit data to the robot controllers 120 used to manage communications during a match. The initial data may include one or more of the follow: the WAP's SSID, the WAP's WPA password, the robot's assigned IP address, the team's pre-shared security key, IP addresses of the robots 110-113, operator stations 106-109 participating in the match, a set of rules outlining which robots 110-113 and operator stations 106-109 this particular robot can communicate with, and/or others. If the operator stations 106-109 are not yet connected to the network, or the other robot controllers 120 have not yet been configured, the NAC 102 may communicate this data to the robot controller 120 in response to identifying a connection. In addition, the NAC 102 may configure the robot controllers 120 and/or operator stations 106-109 with QoS policies. For example, the QoS policies may include bandwidth limits from robot-to-robot, robot-to-operator station, and Operator station-to-robot. In some implementations, the NAC 102 can use hardware or software to set QoS limits on traffic from any one of the operator stations 106-109. The master micro controllers or robot controllers 120 may enforce QoS limits from the robots 110-113.

In some implementations, the NAC 102 may manage bandwidth consumed during a robot competition. For example, the NAC 102 may limit the bandwidth consumed by each team 115 and 116. In some implementations, the NAC 102 can substantially ensure data distribution meets allowed criteria setup by the event organizers. Through the use of a firewall, for instance written in software on a Personal Computer, the NAC 102 may block any data flowing from any one destination to another. The NAC 102 may also have bandwidth limiting functions, commonly called quality of service for computer networks. In some implementations, the quality of service functions can limit each network entities total bandwidth consumption, substantially ensuring that network congestion does not occur. This NAC 102 may then route messages out to one or more radio channels, using a wireless device 105, such as an 802.11 Ethernet Wireless Access Point (WAP). In the illustrated implementation, the WAP is directly connected to the NAC. The wireless paths to robots 110-113 may be any method of communicating data in air or a vacuum, such as radio frequency, sound, ultrasonic sounds and light. Also connecting to the NAC 102 may be one or more control devices 101 to control high level match flow and/or perform non game data communications tasks, such as scoring. The robots 110-113 then receive the wireless data and act on that data per the associated robot controller 106-109.

Most competition participants may not attempt any attacks on the network, wired or wireless. In case of any attacks or abuse, intentional or not, there should be a method provided to monitor the NAC 102 activity such as a monitor and keyboard displaying a custom user interface. This interface should be provided to an event administrator or other technical staff. The NAC monitoring interface may provide data about one, some, or all devices connected to the network and provide any additional information that may be helpful when running an event, for example IP addresses active on the network, status of robot and operator station connections, wireless signal strength on the robot(s), battery voltage levels, etc. It may also provide data on large amounts of unexpected or unauthorized network traffic, for example which robots 110-113 or operator stations 106-109 may be the source of this network traffic. In addition to providing this data, the means to prevent or halt this activity should be available on this NAC monitoring interface, if it has not already been addressed by the hardware or software firewall.

The robot controllers 120 can include any software, hardware, and/or firmware configured to control network communications in accordance with match guidelines. For example, the robot controllers 120 may execute security processes as well as QoS features. The robot controllers 120 may be built with a master micro-controller connected to its wireless radio. In some implementations, the master micro controllers 120 may not be a user modifiable device. The user programmable part of the robot controllers 120 may be a separate micro controller or separate PC connected to the master controller. Network traffic to and from the user micro controllers may be forced, routed or otherwise directed through the master controllers 120. The master controllers 120 may be designed with configurable firewalls and quality-of-service limits. The robot firewall may limit communications with only approved network destinations such as associated operator stations 106-109. This may substantially ensure that robots 110-113 can only talk to the approved other robots 110-113. The robot controllers 120 may discard unauthorized outbound transmissions, which may reduce congestion in the network.

When operator stations 106-109 are connected to the network at the player station, the software on the operator stations 106-109 may receive setup initialization data from the NAC 102 similar to what the robots 110-113 receive. For example, the stations 106-109 may obtain an IP address, the team's pre-shared security key, and/or a set of rules and details outlining which robots 110-113 and operator stations 106-109 this particular one of the operator stations 106-109 can communicate with. In some implementations, the operator stations 106-109 may not store the WAP information, since the operator stations 106-109 may not be connecting to the wireless portion of the network. If other operator stations 106-109 are not yet connected to the network, or the robots 110-113 may not yet have been configured, the NAC 102 may communicate their IP address data to the operator stations 106-109 when available. In some implementations, when drivers tether robots 110-113 to associated operator stations 106-109 via, for example, Ethernet, the 802.11 wireless radio is disabled. The operator stations 106-109 are hardwired to the robots 110-113 to safely control the robot 110-113 in the pits for repair and debugging purposes.

In order to ensure that the operator stations 106-109 may only send control data to associated robots 110-113, pre-shared security keys may set up to link these pairs. At the operator station level, each control packet sent may have the pre-shared key embedded within the packet at a specified location. At the robot controller level, the master micro controller 120 may verify the pre-shared key, matching it with the one assigned before the beginning of the match and discarding any data that is not intended for this particular robot. Enforcing the use of this pre-shared key may prevent unauthorized control of robots 110-113 that otherwise could result in unsafe actions, self inflicted robot damage and/or actions in violation of the game's rules.

To further secure the network, initialization data that is obtained while tethering or plugging into the system 100 at the player station can be set to expire periodically. The IP address, team's pre-shared security key and communication rules may be changed as often as every match or some greater interval. Periodically changing this information adds another layer of complexity and protection to the other security measures used on the network.

The first step in securing this system 100 is to minimize or otherwise reduce the number of connections to the outside world. In most instances, the teams 115 and 116 and robots 110-113 do not need to be open to the Internet. In some implementations, the field control device 101 may connect the scoring system to the Internet, so passing this through a firewall, or placing these systems on a secure sub-net may minimize or at least reduce security risks from persons outside the competition event.

To further increase security, the system 100 may be closed to any unneeded connections and contain only the necessary event administrations and team connections. Non-robot connections could be hard-wired connections to minimize or at least reduce wireless network traffic.

In one aspect of operation, the teams 115 and 116 may remove robot 110-113 from shipping/crate upon arriving at a competition. Initially, the robots 110-113 and the associated operator stations 106-109 may be tethered together, such as using a direct wired Ethernet connection (without a network present), to synchronize team information (e.g., team number) on robot controllers 120, if not set already. In some implementations, the robots 110-113 and the associated operator stations 106-109 may be tethered, optionally, to download user code to the robot controllers 120. This tether may be defined as a direct wired Ethernet connection, although it could be a secure network connection. The teams 115 and 116 may bring robots 110-113 to the competition inspection station (not illustrated) for physical inspection. After passing inspection, the robots 110-113 may be tethered, and an inspection state may be set on the robot controllers 120 (with date/time stamp) for this event. In some implementations, this can be set in the robot's master controller 120 and cannot be changed by the robot programmer or the robot's user CPU.

Prior to each match, while in the queuing area or on the field 114, teams 115 and 116 may tether their robot controllers 120 to the NAC 102 to receive the information necessary to compete in the next match. The data provided by the NAC 102, as described earlier, may include IP addresses, wireless access keys, that may include SSIDs, security keys for encryption, pre-shared keys for verification of data as well as any other data. In some implementations, the NAC 102 may download a table including data on more than one match. For example, the NAC 102 may download one or more of the following: match types (e.g., practice, qualification, elimination, etc); team's security key (can be: random; expires; can be changed each match) used by both the robots 110-113 and the operator stations 106-109; robot's IP address that may be random, may expire, and/or may be changed each match; field's WAP SSID that may be random, expires, and/or can be changed each match; WAP's WPA key that may be random, expires, and/or can be changed each match; other participants and robots IP addresses as needed per the games rules; verify inspection has passed; and/or others.

In connection with starting a match, drivers may place robots 110-113 on the playing field 114, turn on the robots 110-113 (if not already on), and leave the field 114. In some implementations, the robots 110-113 begin listening for the associated operator stations 106-109 to be plugged into the system 100 and/or send out information over the wireless link via the WAP 105. The drivers may connect the operator stations 106-109 to the system 100 via Ethernet. In some implementations, the operator stations 106-109 may be connected to the system 100 prior to activating the robots 110-113. The operator stations 106-109 may execute software that logs into the system 100. In this case, the operator stations 106-109 may provide one or more of the following to compete in the next match: team's security key that may be the same as the robot, may expire, and/or may be changed each match; IP address that may be random, expires, and/or changed each match; other participants and/or robots IP addresses as needed per the games rules; and/or other information. After the teams 115 and 116 are logged into the system 100 and verified, the field control system 101 may transmit a message to the robots 110-113 and operator stations 106-109 to begin the match. In some implementations, the robot controllers 120 can enable signal outputs to move the robots 110-113, such as to speed controllers, motors, relays, solenoids, servos, and/or other robot elements. In accordance with game rules, the robots 110-113 may be controlled via autonomous or tele-operator modes. During the match, the NAC 102, operator stations 106-109, robot controllers 120, network switches 103 and 104, network firewalls, and the field control system 101 operate to substantially ensure that: (1) communication of text, video, audio, other data, and operator station is sent only to the intended and authorized recipient(s); (2) no network device consumes more than its allocated share of network bandwidth through quality of service limits; and/or (3) no network device receives any transmission that it is not authorized to receive. In response to at least the match ending in accordance with game design, the field control system 101 may end the match and the robot controller 120 may disable signals that allow robot movement. The drivers may unplug operator stations 106-109 from the system 100 and remove operator controls from the player station. In addition, the drivers may power down and retrieve the robots 110-113 from the playing field 114 and return to the pit (not illustrated).

Figure 2:
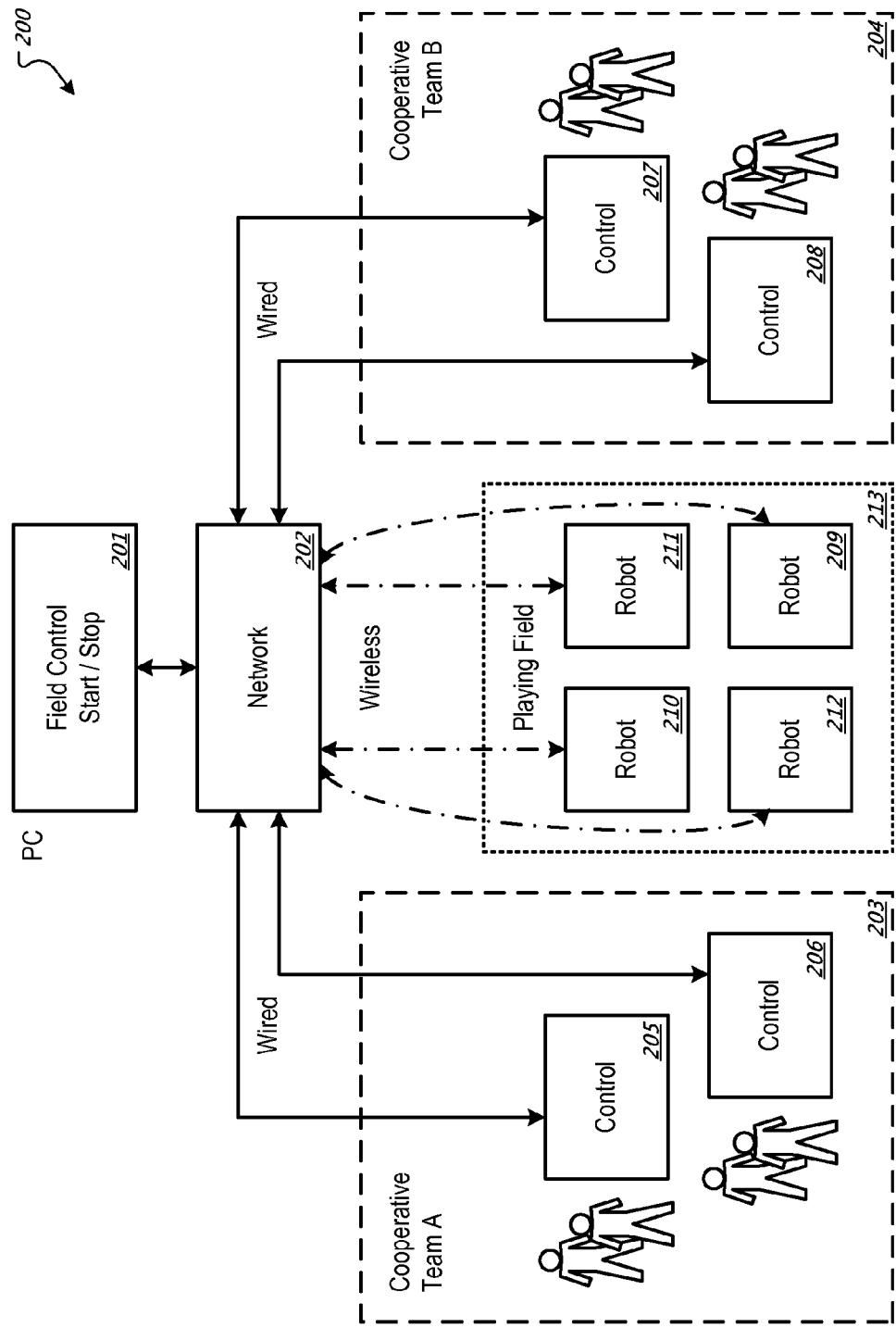
FIG. 2 is a block diagram illustrating another example of a robot competition control system.

FIG. 2 is a block diagram of an example of another field competition control system 200. In this implementation, the system 200 can also consist of equipment to control the competition 201, the communications equipment 202, one or more Cooperative Teams 203 and 204, and robots 209-212. In some implementations, the system 200 may reduce cost as compared with the system 100 by directly connecting operator stations 205-208 to the NAC 202.

With the alternative Field Competition Control System 200, the operator stations 205-208 of each side may be connected directly to the multiplexing device 202. This multiplexing device 202 may replace the NAC 102 in FIG. 1. The NAC 202 may, for example, be a hardwired Ethernet switch with a built in 802.11 Wireless Access Point (WAP). Many other network configurations are possible as understood by the computer industry. The wireless media linking the NAC 202 to the robots 209-212 may be any method of communicating data in air or a vacuum, such as radio frequency, sound, ultrasonic sounds and light. Also connecting to the NAC 202 may be one or more field control devices 201 to control high level match flow, communication setup, and/or data communications tasks such as scoring. The robots 209-212 may then receive the wireless data and act on that data per the operator stations 205-208.

As mentioned above, the system 200 may reduce cost and/or reduce cabling. In some implementations, certain security measures, such as maintaining, controlling and/or limiting data may be limited and/or full length cables may be used between the operator stations 205-208 to the NAC 202 instead of star network connecting into switches 103 and 104 with short cables and running the multiplexed cable back to the NAC 102 as shown in FIG. 1.

In some implementations, firewall and QoS features may be embedded, stored or otherwise processed by the operator stations 205-206. The functions of the Field Control 101 and the NAC 102 of FIG. 1, and similarly the Field Control 201 of FIG. 2 may be divided in a variety of ways by the system designer. The NAC 102 may, for example, be a PC that performs the firewall and QoS tasks. The NAC 102 and/or the NAC 202 may also, for example, be an off the shelf or custom firewall that is configured and controlled by the field control device 101 or 201. The NAC 202 of FIG. 2 may also execute some, all, or different firewall and QoS tasks of the NAC 102.

The field control device 101, the NAC 102, the field control device 201, and/or the NAC 202 may implemented as described below. The systems 100 and/or 200 may allow from zero to many operator stations (e.g., 106-109, 205-208) to send control to and receive input from zero to many devices such as robots (e.g., 110-113, 209-212), with data flow in many possible configurations. Typically, the systems 100 and/or 200 receive operator commands from two groups (e.g., 115, 116, 203, 204) of three robots each, and route the operator data only to their respective robot. Similarly, the robot data may be sent back only to the respective operator station (e.g., 106-109, 205-208).

The systems 100 and/or 200 can be a combination of hardware, software, and/or firmware. Typically, the systems 100 and/or 200 may consist of primarily a PC, wireless gateway, Ethernet switches and/or software. The wireless gateway (e.g. WAP 105, NAC 202) may connect to devices such as robots (e.g., 110-113, 209-212) via wireless Ethernet. The Ethernet switches (e.g., 103, 104, switches integral with NAC 202) may connect to the operator stations (e.g., 106-109, 205-208) via wired Ethernet. The PC may interconnect the wireless gateway to the Ethernet switch via a Field Control Application.

A system application may allow operator data to be routed to the robots (e.g., 110-113, 209-212) in a sanity checked manner to match the system or game rules and in a manner to not overload or take more than a fair share of the wireless system bandwidth. Similarly, data from the remote devices or robots (e.g., 110-113, 209-212) may have sanity checked data routed back to the operator stations (e.g., 106-109, 205-208). System and game rules may be designed in to change operation during the game or as a result of robot or sensor action, or audience interaction. As an example, point values for tasks may dynamically change with respect to match mode, time, or field component availability. Robot data may be broadcasted back to its respective operator stations (e.g., 106-109, 205-208) and/or alliance partners. As a form of penalty, the robot data may be broadcast back to the opposing alliance, or a portion of the robot's motion may be disabled. The system application may also verify that the proper operators are plugged in to the appropriate stations, may independently enable or disable the robots (e.g., 110-113, 209-212) and may give the systems 100 and/or 200 human operator indications of operator, robot, field and match readiness. The systems 100 and/or 200 may have auxiliary input/output to provide start/pause/resume/stop functions, emergency stop functions and display status. The system application may monitor the field sensors for game progression, for safety such as gate closure verification, and/or to activate game progression features. Game progression features may include ball drops, gate changes, light color changes, light illumination state changes and/or many others.

Although not as secure, the systems 100 and/or 200 may be modified to add NAC capabilities at the Personal Computer User Process (PCUP) application level of the operator stations (e.g., 106-109, 205-208). In systems that do not utilize all features and functions described with respect to the NAC 101, at least some security and/or QoS features may be transferred to the operator stations (e.g., 106-109, 205-208) and/or the robots (e.g., 110-113, 209-212). By adding this into the PCUP application, substantially the same quality of service for each operator may be achieved. Additionally, the firewall functionality may be added to limit communications to the appropriate devices.

Figure 3:
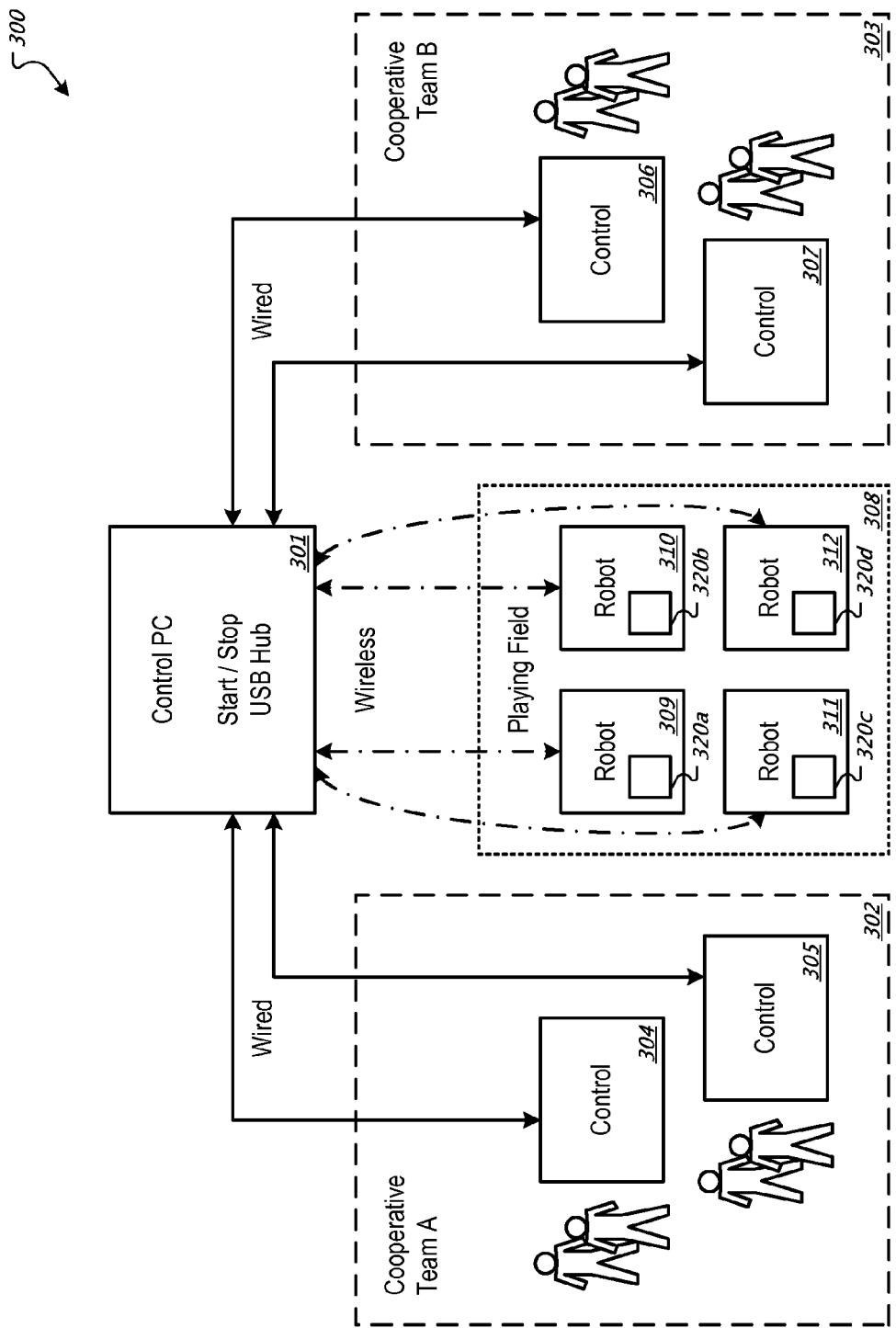
FIG. 3 is a block diagram illustrating yet another example of a robot competition control system.

FIG. 3 is a block diagram illustrating a classroom robotic control system 300. The classroom robotic control system 300 may also control from zero to many robots 309-312, with the robots 309-312 possibly grouped into one or more cooperative teams 302 and 303. The classroom robotic control system 300 may include the field controller system 301, the operator stations 304-307 and the robots 309-312. For example, the system 300 may include six total robots 309-312 consisting of three on a "Cooperative Team A" 302 and three on a "Cooperative Team B" 303.

With the classroom robotic control system 300, the operator stations 304-307 may be, for example, simple USB or Bluetooth or other simple input devices, such as joysticks, and may each connect either directly to a PC or to a hub which is connected to the field controller system 301. The field controller system 301 may function as a field controller with game progression software, input device software and a wireless access point, possibly an 802.11 Ethernet Wireless Access Point. The game progression may be as simple as start and stop of the match, or may evolve to more complex control including robot specific modes and additional modes such as autonomous. The robots 309-312 may then receive the wireless data and act on that data per the robot controllers 320.

Figure 4A:
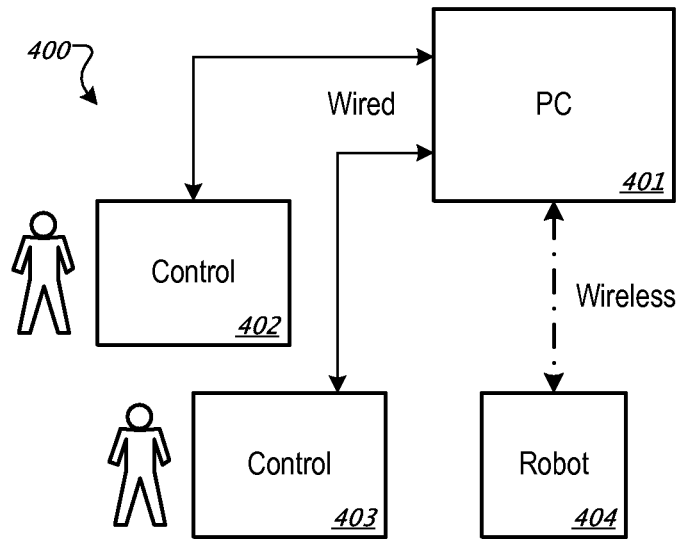
FIGS. 4A and 4B are block diagrams illustrating example wireless links to robots in a robot field competition.
Figure 4B:
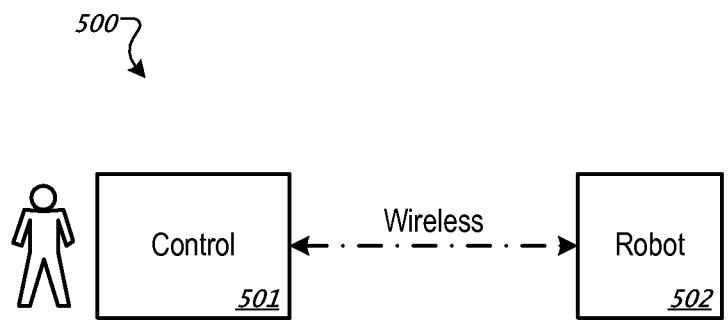

FIG. 4A is a block diagram illustrating an example wireless robotic control system 400 configured to control only one robot 404. The operator station may include one or more input devices 402 and 403 connected to a computing device 401. The input devices 402 and 403 may be joysticks, switches, rheostats, and/or other devices. The computing device can, for example, be a PC. Device 401 may alternately be a simple communication interface between control devices 402-402 and robot 404. Wireless communications to/from the robot 404 may be over an integrated wireless device, a separate wireless access point, or via connection in a home network over a remote wireless access point. In a most basic mode 500 as illustrated in FIG. 4B, the operator control 501 may have an integrated wireless transceiver and directly connect with the robot 502 via, for example, an Ad hoc network.

Figure 5:
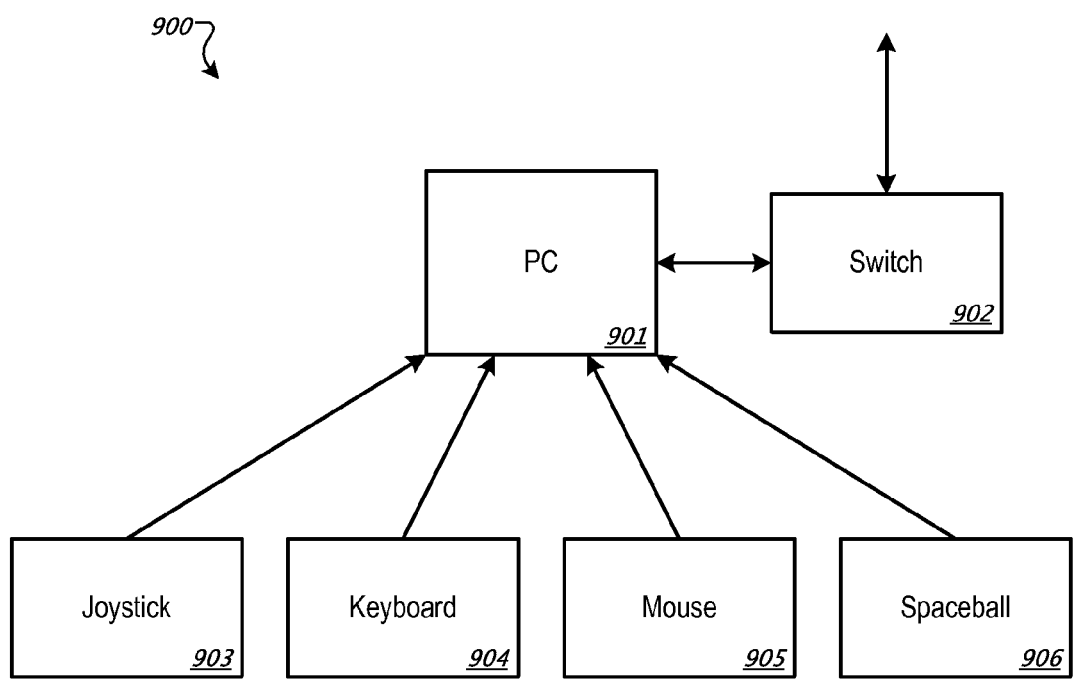
FIG. 5 is a block diagram illustrating an example operator station for communicating with robots.

FIG. 5 is a block diagram illustrating an example operator driver/control station 900 that may be used to communicate and/or control another device such as a robot. It may be a hardware/software combination or a software application running on hardware such as a PC. In the illustrated implementation, the operator station 900 consists of four parts: the input section, the output/display section, the data path and the application section.

The input section (part of 901) may monitor user inputs such as trackballs 906, mouse input 905, joystick input 903, USB device input or other entry devices 903-906. The input section may be provided by the user and not be a supplied part of the operator station 900.

The output/display section (part of 901) may provide results and status through, for example, video, text and/or graphical indications to the operator. This information may be presented using the display of a PC based laptop computer. This presentation may allow varying qualities and/or quantities of data to be displayed based on the user's needs and/or financial capabilities of hardware purchases. The display may present a dashboard window of various robot data, such as commanded joystick position, battery voltage, sensor positions, commanded mode and/or packet loss over the total operator to robot data link.

The data-path section may connect the application portion (part of 901) to another Ethernet device. The other Ethernet device may be a system controller, a system component such as an Ethernet switch, and/or the device to ultimately be controlled. In some implementations, the data path may be implemented via a hardwired Ethernet port. In this case, the data-path section may provide robust communications using known and/or common protocols.

The application section may be hardware, software, and/or firmware. The application section may be implemented using a PC because Ethernet drivers are common, interface drivers are common, and the PC typically has available processing bandwidth to aid in user designed algorithms and/or decisions. Closed loop algorithms may be implemented, especially if the robot user hardware is under-powered. The user may consider the data-path bandwidth and latency. Typical values of each may be measured and made available to the user. The application may also be responsible for QoS (throttling the amount of data sent in or out of the data path to prevent over consumption of bandwidth). The system 900 may provide firewalls in each direction, plus may have provisions for the insertion of custom algorithms and/or behaviors.

Figure 6:
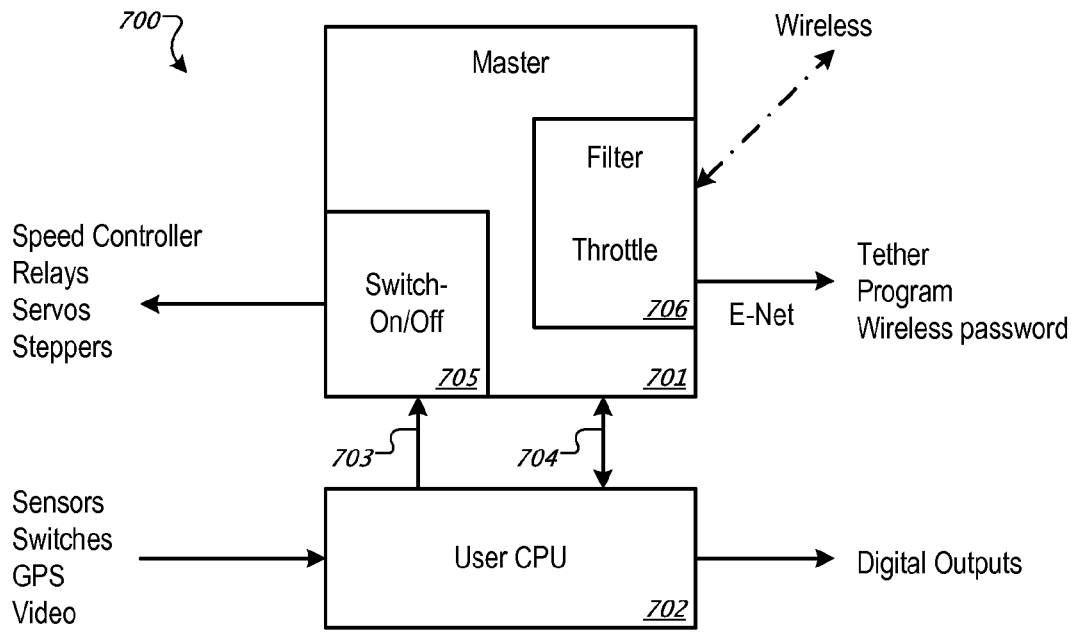
FIGS. 6 and 7 are block diagram illustrating example robot controller assemblies.
Figure 7:
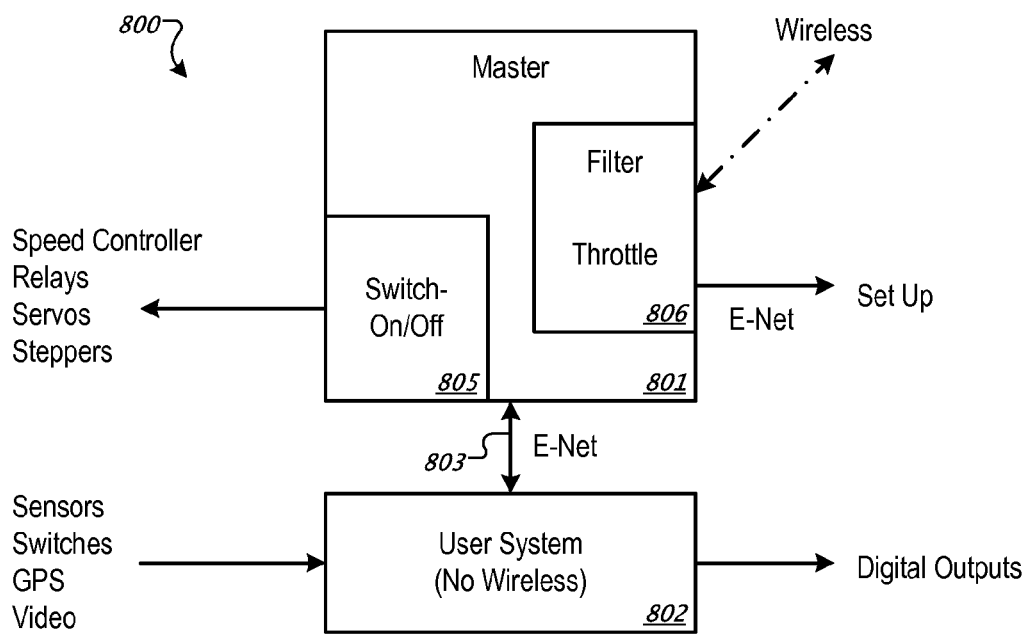

FIGS. 6 and 7 illustrate example robot controller assemblies 700 and 800, respectively. In FIG. 6, the Robot Controller Assembly 700 may be used to allow autonomous, remote and/or tethered operation of a robot, with remote operation being provided by a data path such as a wireless network, tethered operation being provided by the same or an additional data path such as a wired Ethernet connection, and autonomous operation provided by an additional device such as a user supplied CPU board or by additional components on the robot controller assemblies 700.

The robot controller master 701 may consist of a power supply section, user-to-motion section (On/Off switch) 705 and a control section (Filter/Bandwidth Limit) 706. The power supply section may consist of a primary supply section and optionally a secondary supply section. The primary supply section may convert power from the primary robot power source to the voltages needed for operation of the other robot controller components and possibly user supplied devices. The power supply may also contain a secondary supply section to power portions of the robot controller 701 alone, or as a back up to the primary supply section. The primary robot power source is typically a large capacity battery. The secondary supply source is typically a smaller capacity battery with sufficient energy to supply communications and/or processing components voltages needed during brief times that the large capacity battery voltage is being drawn down to a low level, when circuitry needing the power sees the primary voltage drop too much due to bad connections, when the primary source is at a low energy level, and/or when other events occur. The pros of not having a secondary supply section are reduced cost and complexity. The cons of not having a secondary supply section are that operation may become intermittent when the primary robot power source or distribution system is being electrically taxed in a competitive environment or when the robot electrical system has intermittent connections.

At a high level, the user-to-motion section 705 (On/Off switch) may be a relatively simple part of the robot controller master 701 and may connect the motion control interface of the user supplied device to the motion control devices when commanded by the master control section. When communication is lost over the data path or when commanded by the data path, portions or the entire motion control interface may be shut off. Shut off may be an electrical open, electrical grounding, electrical neutral, electrical high or other state change. Motion control devices on this interface may include but not be limited to pulse width modulation devices such as speed controllers and hobby servos, servomechanisms, resolvers, stepper motors, relays, brushed dc motors, and/or others. It may also be used to switch on/off power to external devices or to control a secondary data channel. The connections to the motion control devices may be shut down for safety considerations or to follow game play rules during pre-match power up, loss of signal, during a dangerous condition, at the end of a match and/or other events. The pros of not having a user-to-motion section 705 are reduced cost and complexity. The con of not having a user-to-motion section 705 is the inability of not being able to halt the robot when needed by safety or the progress of the game. Additionally, without a user-to-motion section 705, faulty user code and/or user hardware may not disable the robot during appropriate portions of the game or during unsafe conditions. A pro of having the user-to-motion section 705 is that the user section may be powered up and monitoring inputs before the match starts. The robot may then be instantly ready to perform a task that actually utilizes a complex algorithm, such as a vision task.

In another configuration of the user-to-motion section 705 or 805, the master 701 or 801 may generate signals to drive the external motion devices. The processor on the master 701 or 801 may enable or disable this output as commanded by the NAC or field control. This method may free the user CPU 702 or user system 802 from the time critical nature of generating these signals directly. The user CPU 702 or user system 802 may determine the parameters of these signals to move the robot and it's associated components, however, the parameters may be passed to the master 701 or 801 via the communication path 703, 704, or 803.

The control section 706 (Filter/Throttle) of the robot controller master 700 connects the data path to the user CPU section 702. The connection to the data path may be, but is not limited to, a wireless connection or a hardwired Ethernet connection. When the master 702 is hardwired via the data path to a field control system or operator station, it is typically called tether mode. The connection from the master 701 to the user CPU section 702 may be, but is not limited to, a processor to processor SPI bus or hard wired Ethernet connection. The control section 706 may also select modes of the user-to-motion section 705. Modes are, but not limited to, Disabled— where no robot movement is allowed, Autonomous—where robot movement is allowed and typically controlled by on board sensors and software but Operator input is ignored, and Normal—where Operator input is allowed.

The control section 706 may have hardware, software and/or firmware to not only bring in data for robot operation, but provide for mode control, program updates, game rule updates or progress, plus filtering of what data can be transferred and at what rate for that operator connecting with that robot and for alliance operators or robots connecting to/from it and for competing operators or robots connecting to/from it. Typical rules may allow a designated operator to control/monitor only its designated robot. If the data path, such as a wireless connection, also contains data from other operators or other robots, the game rules may be implemented to filter out data from competing operators, for example. This may also allow multiple fields to share a single or reduced quantity of data paths, with only the correct data being routed to the correct operator or user section and only during the correct time frame of the match. The multiple fields could include a practice field and could include off-field checkout of communications and control between robots and their operator equipments.

The control section 706 may also have a hardwired input/output to provide for the data path using a non-wireless configuration (Ethernet). This could be used for testing all or portions of the wireless data path sequences. The control section connection to/from the user CPU section may typically have a software layer limiting the data to a predefined protocol and rate of transmission. Data space in these packets may also have portions allocated to user defined data and for portions intended for other robots, for instance other robots on the same alliance. The format of the data intended for other robots may be predefined with a simple protocol such as size limited text packets, or more stringent 8-bit text messages with parity and start and stop bits.

The user section may be a user CPU 702 as an added component of the robot controller or a user supplied user system 802. Typically either may have a processor running supplied code with user configurable changes, receive inputs from various sensors such as gyros, GPS receivers, switch contacts, transducers, light detectors and position encoders. The user section 702 and/or 802 may process the received data from it's operator, from other operators, and/or from other robots to generate motion control that it may send to the user-to-motion sections 705 and 805 which is then passed to the motion devices when allowed under the limits of the game rules, game modes and/or desired robot response.

One potential advantage of having the user section 802 being user supplied is that it may be changed as technology progresses, and may be tailored to the sophistication and cost needs of the user or the event. The interface to the master section 701 or 801 may be via a defined interface. Possible interface options are Ethernet, I2C, SPI bus, 8-bit two wire serial and there are many others. The hardware of the user section 701 or 801 may be, for example, a simple microcontroller to a multiprocessor PC. Another example advantage of the user section 702 being supplied as part of the robot controller 700 could be that users may initially have equal user section hardware and an equal initial software shell. The user CPU 702 may be a microcontroller with built in timers, uarts, PWM generators, RAM, FLASH and/or reprogrammable code space. Additionally the interface to the master would not have to go to a separate board, so there would not be the added complexity and expense of additional connectors and cabling. The user section 702 or 802 may also have outputs that connect to non-motion items (Digital Outputs). Commonly used items may be communications with devices such as cameras, to control lights and/or to control non-game related decorations. Inputs to the user section 702 or 802 may be for setting robot behaviors in various modes. Highly beneficial are switch inputs for selecting between different initial autonomous actions, such as turn left in 20 feet, go straight 10 feet and stop, move forward till contact is made, then drop arm, then reverse and travel 10 feet, then stop.

In one aspect of operation, the robot controller 700 or 800 is turned on. In response to at least detecting a hardwired connection (e.g., Ethernet), the master controller 701 or 801 provide or receive information such as one or more of the following: inspection data; match initialization data may be passed for one or more matches; bandwidth transmission limits; allowable IP addresses (firewall settings); control data is received from operator stations and passed to the user CPU 702 or 802 to interpret data; reprogram the User CPU data is received and passed to the user CPU 702 or 802 to store program in memory. The master controller 701 or 801 may search for wireless network with parameters previously received. In response to at least identifying a wireless network, master controller 701 or 801 may log onto wireless network with parameters previously received. The master controller 701 or 801 receives information from NAC including, for example, an IP address, information about other robots, operator stations, and communication rules specifying which robot(s) and operator station(s) are available to communicate with. The master controller 701 or 801 may receive a signal from NAC indicating a match type such as autonomous mode, and in response to the signal, the user CPU 702 or 802 may run and autonomous program, if available. The master controller 701 or 801 may receive a signal from NAC indicating user controlled mode, and in response to at least this signal, the control section 706 or 806 may be ready to receive motion commands. The master controller 701 or 801 may receive a signal from NAC indicating disable mode, and/or in response to a loss of signal, the control section 706 or 805 halts motion control.

In some implementations, the master controller 701 or 801 may receive a signal from an associated operator station, and in response to at least the signal, the master controller 701 or 801 may compares team's security key in memory with team's security key in command data. If the security keys matches, then the master controller 701 or 801 passes a signal to the user CPU 702 or 802 to interpret data. If security keys do not match, then the master controller 701 or 801 discards the commands and may notify the NAC of a security violation.

In some implementations, the user CPU 702 or 802 may pass feedback data to the master controller 701 or 801 to send to an identified operator station. The master controller 701 or 801 may verify data can be sent to the identified operator stations (e.g., Operator PC 'A'). If the communication is allowed, the master controller 701 or 801 sets bandwidth limitations and sends data to the identified operation station (e.g., Operator PC 'A'). If communication is not allowed, the master controller 701 or 801 may discard the data and may notify the NAC of a security violation. The user program may pass feedback data to the master controller 701 or 801 to send to robot (e.g., Robot 'B'). If the communication is allowed, the master controller 701 or 801 may set bandwidth limitations and sends data to the robot (e.g., Robot 'B'). If communication is not allowed, then the master controller 701 or 801 may discard data and may notify the NAC of a security violation. If the master controller 701 or 801 detects an increase of illegal outgoing data, then the master controller 701 or 801 may throttle data according to predefined limits. If the master controller 701 or 801 receives new communication rules from NAC, the master controller 701 or 801 applies for future communications accordingly and may notify the user CPU 702 or 802 of the changes. If the master controller 701 or 801 receives a signal from the emergency stop button indicating disable mode, the master controller 701 or 801 may halt motion of the robot. If the master controller 701 or 801 receives signal from NAC indicating disable mode at the end of a match, the master controller 701 or 801 may halt motion of the robot.

Figure 8:
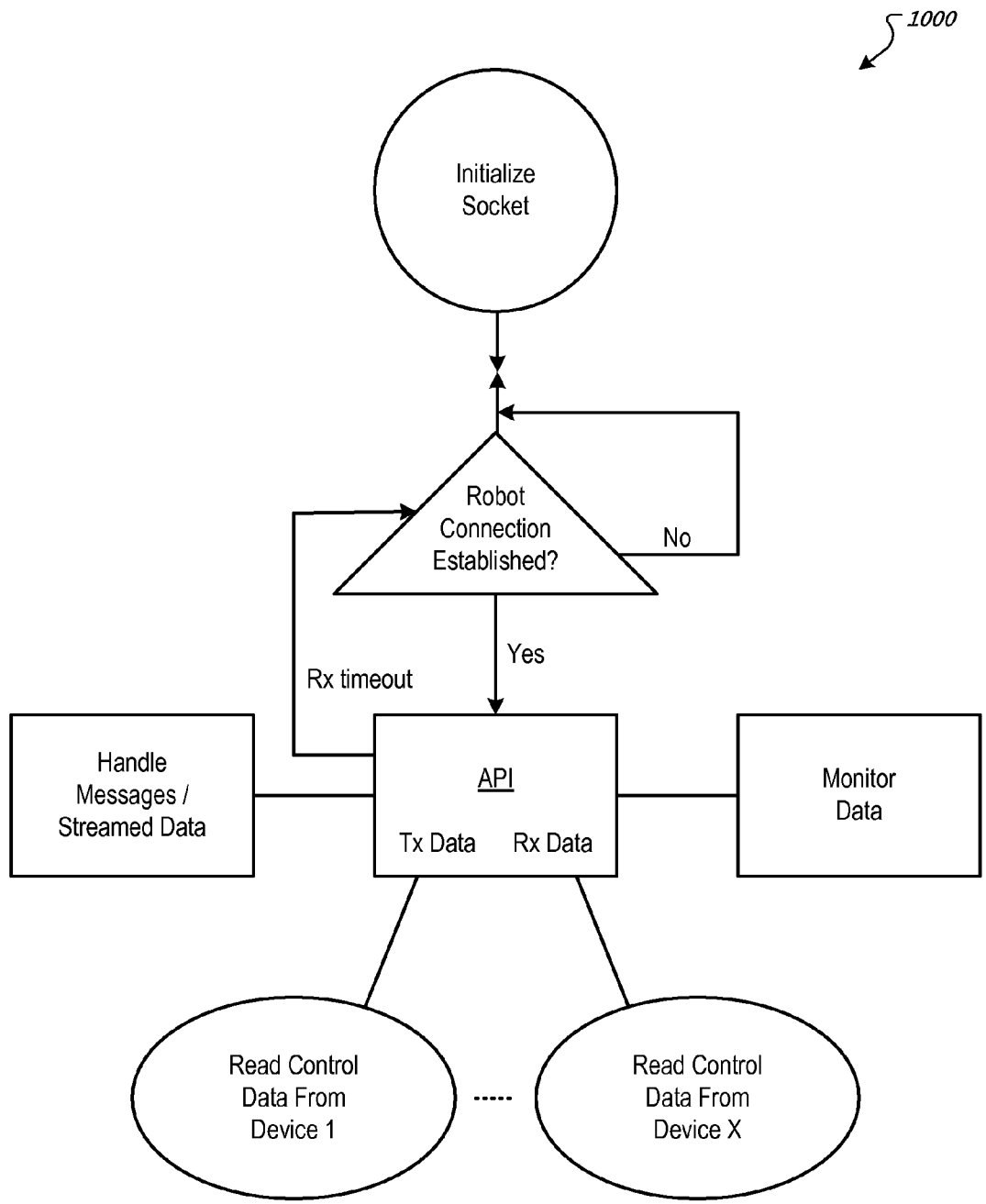
FIG. 8 is a block diagram illustrating an example application executed during a robot competition.

FIG. 8 is a block diagram illustrating a PC User Process (PCUP) 1000 that may be an application that allows an operator to easily connect to a robot and/or provide an Application Programming Interface (API) for customization and expandability. Once a robot has been linked up via a field control system or, for example, the operator's PC, associated data may be stored in the robot's flash memory that may be used later to connect the PCUP 1000 via a wireless link.

The associated data to be used for the wireless connection may be (but not limited to) an IP address, a unique key, and/or a team number. The PCUP 1000 may allow one or more control devices (such as a joystick, mouse, keyboard etc.) to remotely connect to a robot or simulator. It may consist of a real time data engine that may modify data packets to and from a robot. It may also provide data monitoring and may have logging capabilities.

The PCUP 1000 may enable a programmer to easily modify position dependent fields in a structure that the robot receives (a data packet). The structure may be a union of other control data to provide expandability. The control data may be considered to be the data needed to operate motors, relays, digital outputs, etc. The PCUP 1000 may not be limited to a robot connection only. It may support connecting to a simulator as well. This connection may enhance the programmer's ability to test/debug code before it gets downloaded to a robot.

In some embodiments, the PCUP 1000 may be a threaded application that can be started via an initialization call. This call may attempt to set up a socket connection. If the connection is successful, a handle may be returned and used throughout the user interface code. The user interface code may wait till a robot connection is made before transmitting control data via the socket connection. Once a connection is established, control data may be transmitted at a specified rate. The PCUP 1000 may be a high priority thread in order to keep a robot refreshed with current data as close to real-time as possible.

The control data intended for robots may be sent via, for example, a User Datagram Protocol (UDP) packet. UDP packets are not retransmitted when lost. When controlling a robot, real-time or near real-time data may be preferred. Data sent via methods such as Transmission Control Protocol (TCP) that get retransmitted when lost may cause issues when controlling a robot. Using TCP is certainly possible, however, the robot controller may then use additional processes to check for and discard old retransmitted data. Another method for discarding out of sequence control data may be to time stamp or sequence number each packet in the PCUP software, and later let the robot controller examine these packets and discard old or out of sequence packets.

Incoming data frames may be parsed, displayed, monitored and/or logged. The user may have the flexibility as to how the data may be parsed based on his knowledge of the programming language being used. The robot may pass other data to the PCUP 1000, such as streaming video, allowing a user to make use of it, for example distribution to a video manager. Since the data may be parsed, monitoring and/or logging may be easily achieved.

Any device being read by the PCUP 1000 (e.g., a joystick) may allow the user to map control data via API calls. After the call completion, the outgoing data packet may be updated with the latest control data. Call backs may be provided to retrieve the control data from each device to make operator station commands seem uninterrupted.

As used herein, software generally includes any appropriate combination of software, firmware, hardware, and/or other logic. For example, this software may be written or described in any appropriate computer language including, for example, C, C++, Java, Visual Basic, Assembly, Perl, ABAP, any suitable version of 4GL, or any combination thereof. It may be understood that software may include a single multi-tasked module, or the features and functionality performed by this software may be performed by multiple modules, perhaps distributed among various devices. Moreover, some or all of these aspects may be further included in respective systems or other devices that may execute or implement suitable software. The details of these and other aspects and embodiments of the disclosure are set forth in the accompanying drawings and the description below. Other features, objects, and advantages of the various embodiments may be apparent from the description and drawings, as well as from the claims.

A number of embodiments of the invention have been described. Nevertheless, it may be understood that various modifications may be made without departing from the spirit and scope of the invention. For example, in addition to the NAC controlling the robotic elements and communication of the competition, it may be possible to have the game field, game elements, and/or game rules either be controlled or have some influence on the game play, rules and/or scoring. This may be achieved per game design, robot interaction, operator interaction, audience interaction, and/or by some other random method(s).

It may be possible to have some action performed on the game field that affects the game play, field layout, operator interfaces, team structure, or some other significant outcome. For example, the game may not be started until all robots and operator stations are connected to the network and the field and game elements are in the proper starting position(s). Added safety measures may be implemented using this system, such as checking that entry gates are closed may be dynamically changed based on events in this match, other matches at this event, other matches at other events, etc.

It may be possible to allow audience interaction to affect game play by way of some sort of communication devices such as cell phones sending standard, predetermined text messages to some predetermined destination. Based on the amount of text messages, the game play may be changed to the audience's liking.

In some examples, with regards to safety, each player station may be provided with a means to instantly stop their robot's movement in the event of an emergency, such as an uncontrollable or unresponsive robot. For example, such means may be executed by way of a red emergency stop button provided at each player station. There may be many different options when connecting this emergency stop to the system, for example via USB directly into the Operator's PC working with the PCUP, USB daisy chained directly to the NAC, or via RS-232 directly back to the NAC. Loss of a valid signal from the field may also trigger an automatic robot halt.

In some examples, some robot competitions may require robots to be inspected for various reasons before they can compete. Inspection may provide a chance to make sure the robots are built with safety and the rules of the competition in mind. After a robot has been physically inspected by an authority at the competition, the robot may be tethered by way of a physical connection, for example as Ethernet, to a system to mark the robot as being inspected. While tethered, the system may set a value in the robot's master controller signifying that this robot has passed inspected. In some implementations, this inspection value cannot be changed by the robot programmer, robot's user CPU, or by any other user means. This inspection value may be date and time-stamped to allow for multiple inspections throughout a competition or multiple competitions. As safety is very important in robot competitions, the NAC or field authorities monitoring the NAC or personnel operating the Field Control PC may use this inspection value to determine whether or not a robot may compete in the match. The inspection value may be expanded to contain more detailed information, such as a database storing which portions of the robot have passed inspection or contain notes from the inspector(s).

In some examples, one method of reducing unknown issues at the operator stations, such as operating system vulnerabilities, may include providing a stripped down version of an operating system, such as Linux, to participants. Rather than let the user run the operator station software on an operating system with many uncontrollable factors, the user may boot (or reboot) into the special operating system running only the PCUP and the necessary drivers to accommodate the user input devices, such as joysticks. This special version of the operating system may be distributed by way of a removable storage device, such as a USB drive, or distributed on the Internet such that it may be downloaded and dual-booted on the operator station. The NAC may then verify that the correct version of this Operating System is running, and it is the only allowable method when connecting an operator station at the drivers station.

In some examples, an effort to simplify the system may be necessary such that each robot or operator station may not know any communication rules or IP addresses other than the address of the NAC. The NAC may then route traffic appropriately to the desired destination, following rules specified by the current game rules. By doing this, the NAC may not have to distribute the communication rules at the beginning of the match, or at any time during the match, since it may be handling this routing. In order to accomplish this, the PCUP and robot micro controller may have to communicate using a simplified language set referring to the data's source and destination rather than an IP address, for example, 'my robot', 'my team', 'team 148', 'team 229 robot', 'team 47 operator', 'my driver', 'all teams', 'all friendly teams', 'field entity', and 'scoring system'. In some cases, the functions of the NAC and the Field Control/Scoring PC are implemented by the same device.

In some examples, during an event, the NAC may constantly relay messages between operator stations and robots, and relaying some of the error messages to the NAC monitoring screen. These messages may be sent to other participants in the event, as well. Referees may receive dynamic rule updates, information about the robots on the field such as battery levels and/or abnormal network data traffic violations. Event managers may receive updates about what match is being played, the event schedule and/or any deviations from it. Those persons announcing may receive messages about the status of a robot to relay to the crowd. These capabilities may be accomplished through a variety of communication methods such as text-messaging, dedicated applications on wireless devices connected via Ethernet or 802.11, video screens throughout the event, and so on.

Accordingly, other embodiments are within the scope of the following claims.

What is claimed is:

1. A robot controller for managing wireless communication with a robot, comprising:
   memory storing security information assigned to the robot;
   one or more processors operable to:
   receive and transmit signals with a wireless network;
   prior to the robot transmitting a wireless signal identified by the robot and during a robot competition, determine the wireless signal is destined for another robot in the robot competition violating the security information;
   automatically discard the wireless signal in response to at least determining that the destination violates the security information, wherein the robot includes the robot controller; and
   automatically lower a wireless transmission rate to the network area controller based on at least one of wireless signals transmitted to or wireless signals received from an associated operator station in accordance with locally stored QoS features.

2. The robot controller of claim 1, wherein the QoS features include a bandwidth limitation for wireless communications.

3. The robot controller of claim 1, wherein the processors are further operable to:
   store wireless network login instructions in response to at least a direct wired connection to a device; and
   automatically connect to the wireless network in accordance with the wireless network login instructions.

4. The robot controller of claim 3, wherein the wireless network login instructions include a network address and a security key assigned to the robot.

5. The robot controller of claim 1, wherein the security information includes firewall policies.

6. The robot controller of claim 1, wherein the wireless network includes a network arena controller.

7. A computer program product for managing wireless communications with a robot comprising a machine-readable, non-transitory medium storing instructions for causing data processing apparatus to:
   receive and transmit signals with a wireless network;
   prior to the robot transmitting a wireless signal identified by the robot and during a robot competition, determine the wireless signal is destined for another robot in the robot competition violating the security information;
   automatically discard the specified signals in response to at least determining that the destination violates the security information, wherein the robot includes the machine-readable medium; and
   automatically lower a wireless transmission rate to the network area controller based on at least one of wireless signals transmitted to or wireless signals received from an associated operator station in accordance with locally stored QoS features.

8. The computer program product of claim 7, wherein the QoS features include a bandwidth limitation for wireless communications.

9. The computer program product of claim 7, further operable to:
   store wireless network login instructions in response to at least a direct wired connection to a device; and
   automatically connect to the wireless network in accordance with the wireless network login instructions.

10. The computer program product of claim 9, wherein the wireless network login instructions include a network address and a security key assigned to the robot.

11. The computer program product of claim 7, wherein the security information includes firewall policies.

12. The computer program product of claim 7, wherein the wireless network includes a network arena controller.

13. An operator controller for managing communications with a robot, comprising:
    memory storing security associated with a robot competition and QoS information;
    one or more processors operable to
    identify at least one of digital inputs or analog inputs from an operator of the robot;
    receive and transmit signals with a network;
    prior to the robot transmitting a wireless signal identified by the robot and during a robot competition, determine the wireless signal is destined for another robot in the robot competition violating the security information;
    automatically discard the specified signals in response to at least determining that the destination violates the security information, wherein an operator station includes the operator controller; and
    automatically lower a wireless transmission rate to the network area controller based on at least one of wireless signals transmitted to or wireless signals received from an associated operator station in accordance with locally stored QoS features.

14. The operator controller of claim 13, wherein the network includes a network arena controller configured to wirelessly communicate with the robot.

15. The operator controller of claim 13, wherein the operator controller is included in a PC.

16. The operator controller of claim 13, wherein operator controller is configured to communicate only with the robot.

17. The operator controller of claim 13, wherein the security information includes firewall policies.

18. The operator controller of claim 13, wherein the QoS information includes a bandwidth limitation for wireless communications.

19. A computer program product for managing communications with an operator of a robot comprising a machine-readable, non-transitory medium storing instructions for causing data processing apparatus to:
    identify at least one of digital inputs or analog inputs from an operator of the robot;
    receive and transmit signals with a network;
    prior to the robot transmitting a wireless signal identified by the robot and during a robot competition, determine the wireless signal is destined for another robot in the robot competition violating the security information;
    automatically discard the specified signals in response to at least determining that the destination violates the security information, wherein an operator station includes the machine readable medium; and
    automatically lower a wireless transmission rate to the network area controller based on at least one of wireless signals transmitted to or wireless signals received from an associated operator station in accordance with locally stored QoS features.

20. The computer program product of claim 19, wherein the network includes a network arena controller configured to wirelessly communicate with the robot.

21. The computer program product of claim 19, wherein the operator controller is included in a PC.

22. The computer program product of claim 19, wherein software is configured to communicate only with the robot.

23. The computer program product of claim 19, wherein the security information includes firewall policies.

24. The computer program product of claim 19, wherein the QoS information includes a bandwidth limitation for wireless communications.

25. The device for substantially securing communications with robots participating in an event, comprising:
one or more wireless connections for wireless transmitting commands to participating robots during an event;
one or more hardwired connections for communicating with the participating robots prior to the event; and
a security module configured to automatically configure the participating robots with security policies in response to at least the participating robots connecting with at least one of the one or more hardwired connections such that communication between an operator station and an associated robot are substantially secure during the event and automatically lower a wireless transmission rate to the network area controller based on at least one of wireless signals transmitted to or wireless signals received from an associated operator station in accordance with locally stored QoS features, wherein the security policies are at least partially different for each robot, wherein the security policies substantially prevent transmission of a wireless signal by a participating robot if the wireless signal is destined for another participating robot in the robot competition.

26. The device of claim 25, wherein the security policies for each robot includes at least one of a network SSID, a WAP password, an IP address, or a preshared key.

27. The device of claim 25, wherein the device is a PC.

28. The device of claim 25, wherein the device is a network arena controller.

29. The device of claim 25, wherein security policies is stored in a wireless radio of a robot controller system.

30. The device of claim 25, wherein a wireless radio storing the security policies is distributed to each robot prior to the event.

* * * * *